Nov. 20, 1923.
E. J. HUFFMAN
TRUCK COUPLING
Filed Jan. 20, 1921
1,474,478
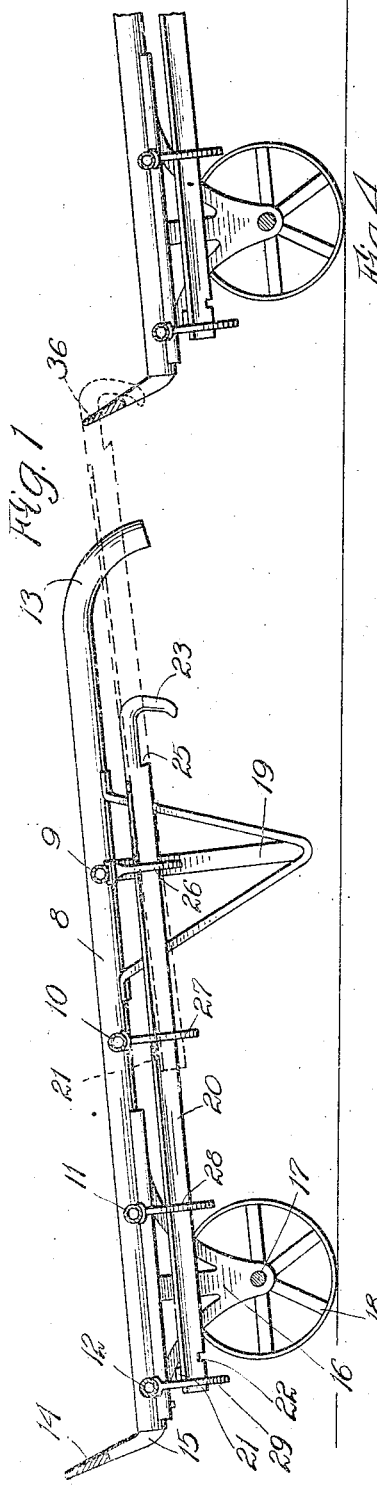
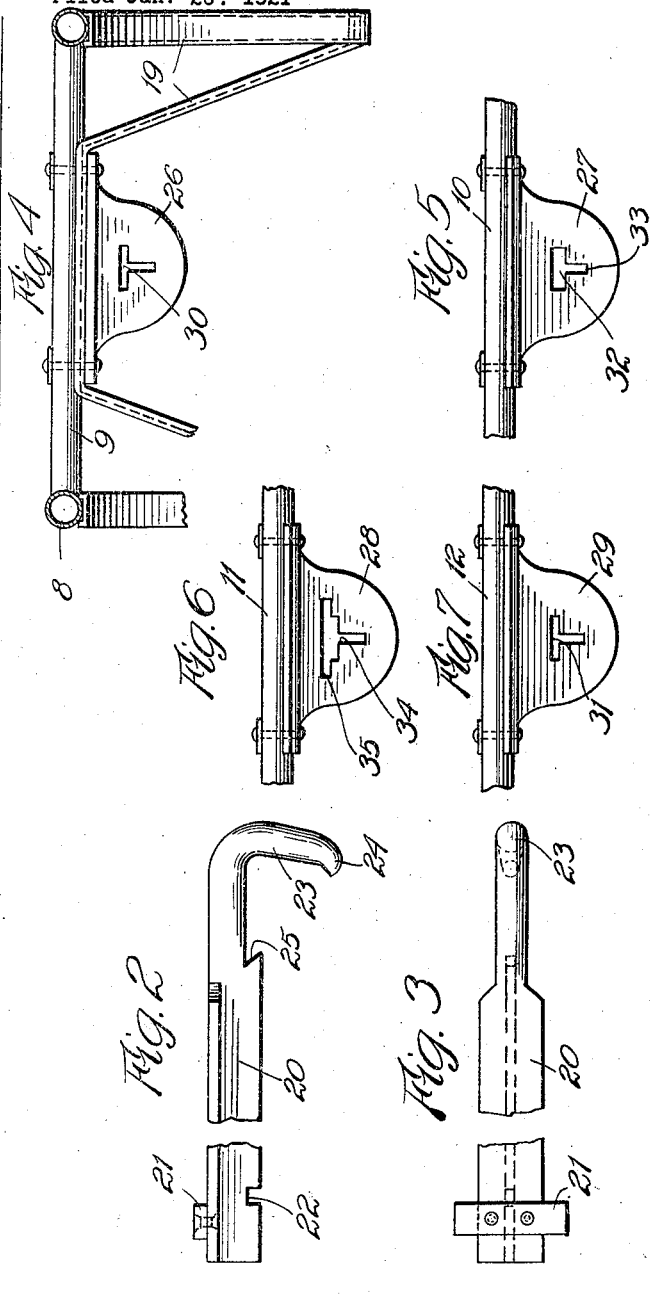
Inventor
Estil J. Huffman
By Miller Chindahl & Parker
Attys Patented Nov. 20, 1923.

1,474,478

UNITED STATES PATENT OFFICE.

ESTIL J. HUFFMAN, OF CHICAGO, ILLINOIS, ASSIGNOR TO SEARS, ROEBUCK AND CO., OF CHICAGO, ILLINOIS, A CORPORATION OF NEW YORK.

TRUCK COUPLING.

Application filed January 20, 1921. Serial No. 438,672.

*To all whom it may concern:*

Be it known that I, ESTIL J. HUFFMAN, a citizen of the United States, residing at Chicago, in the county of Cook and State of Illinois, have invented certain new and useful Improvements in Truck Couplings, of which the following is a specification.

The invention relates to draft couplings for hand trucks of the general type disclosed and claimed in my companion application Ser. No. 422,450.

The object of the invention is to provide a simple, durable and cheaply constructed device adapted to be adjustably attached to a hand truck, and by means of which a train of such trucks may be connected together for movement by a single unit of motive power.

The handling of goods in warehouses and freight transfers involves a considerable amount of hand trucking. Merchandise being moved from one floor area to another, or in and out of cars, is commonly handled on two-wheel hand trucks of the type having a platform frame with rigid handles at one end and an upwardly projecting blade or end rest fixed across the end of the frame opposite to the handles. By tilting the truck on its axle, the end rest may be lowered to the floor and pushed under a package or tiered pile of merchandise. Upon tipping the load toward the frame and manually depressing the handles, the load may be picked up by the end rest and supported on the truck with its weight balanced over the axle, the truck then being wheeled to the desired location. Or, the handle end of the truck may be lowered to rest in a horizontal position supported by a stationary leg carried on the truck frame.

The great advantage of a two-wheel hand truck, as compared with a stabilized truck having three or four wheels, is that the former is not restricted as to turning radius and may be maneuvered in narrow aisles and about sharp corners where other vehicles could not be used.

Heretofore, the use of two-wheel trucks has required a man to each truck to move them about. Having loaded a number of trucks which must be moved a considerable distance through a comparatively clear space, a great saving of time and labor frequently is possible if a train of such trucks might be coupled together and drawn by a single unit of mechanical power.

Obviously a number of such trucks could not be connected together for movement in a train by ordinary link couplers without providing additional wheel supports for the handle ends of the trucks.

It is the particular object of my invention to provide coupling means mounted on a standard two-wheel hand truck, which may be carried thereon in inoperative position without interfering with the ordinary use of the truck, and which may be moved to couple the truck to another, the coupling means being arranged to support the handle end of the truck when so coupled, thus preserving all of the advantages of the ordinary two-wheel truck in its separate use.

I attain this object by employing a coupling bar which is movably supported beneath the frame of the truck and which is arranged to be drawn out between the handles for engagement with the end rest of a leading truck, thereby supporting the handle end of the truck clear of the floor for ready movement on its two wheels.

In the accompanying drawings, I have illustrated a preferred embodiment of my invention but it is to be understood that in the interpretation of the appended claims they are not to be limited to the precise construction or arrangement set forth except as may be necessitated by the state of the prior art.

In the drawings, Figure 1 represents in elevation a two-wheel hand truck of the type described coupled by means of my invention to a similar truck being drawn ahead of it. Figs. 2 and 3 are respectively fragmentary side and plan views of the coupling bar, showing the construction of its front and rear ends. Figs. 4, 5, 6 and 7 illustrate the construction of the hangers in which the bar is mounted.

Referring to Fig. 1, the hand truck illustrated comprises a load platform or frame having side stiles 8 connected by spaced cross members 9, 10, 11 and 12, forming a rigid frame for supporting the load. The side stiles 8 are extended to form at their ends a pair of curved handles 13. At the opposite end of the platform is an end rest 14 shaped with a cross section tapering toward the outer edge of the blade and having angular arms 15 formed at its ends to secure it to the side stiles 8 of the frame. When the truck is in horizontal position, the end rest 14 extends upwardly at such an angle to the bed of the frame, that when the latter is tilted forward on its single axle to its extreme position, the end rest lies flatly upon the floor. The frame is supported at one end upon brackets 16 carrying an axle 17 upon which are journaled a pair of wheels 18. The rearward or handle end of the truck carries two depending legs 19, of any suitable construction, which rest upon the floor to support that end of the frame when the latter is in horizontal position.

The preferred embodiment of my invention comprises a bar 20 preferably constructed from solid stock of T-shaped cross section having the central web extending downwardly. Located near the rear end of the bar is a cross plate 21 rigidly secured on its upper side, and over-extending the lateral edges of the bar a substantial distance. A notch 22 is cut in the depending web of the bar, positioned below and immediately forward of the cross plate 21. The forward end of the bar is formed with a hook 23 extending downwardly and having a rearwardly projecting lip 24 at its extreme end. To the rearward of the hook the depending web is cut away to form a shoulder 25 facing toward the hook.

The bar 20 is supported upon the frame of the truck by means of a series of apertured hangers through which the bar is longitudinally slidable from inoperative to operative position. Figs. 4 to 7, inclusive, show the several hangers employed to support the bar and secure it in its two positions. The hangers comprise plates 26, 27, 28 and 29 respectively depending from and rigidly secured by suitable fastenings to the cross members 9, 10, 11 and 12. The front and rear plates 26 and 29 have centrally located T-shaped apertures 30 and 31, respectively, of similar dimensions to a cross section of the bar 20, and are adapted to receive the latter in a sliding fit. The plate 27 has a similar aperture 32, with the exception that the lower edge of the cross slot receiving the upper web of the bar 20, is cut down a substantial distance, so that when the bar is drawn forward, its rear end may be lowered in the aperture 32 and the notch 22 engaged with the structure of the plate 27 at the lower end 33 of the vertical portion of the aperture. The plate 28 contains an aperture 34 similar in shape to the aperture 30 with the addition of a communicating horizontal slot 35 thereabove to permit the passage through the plate 28 of the cross plate 21 on the end of the bar 20.

With the bar 20 positioned in its supporting hangers as shown in solid lines in Fig. 1, the cross plate 21 abuts the plate 29 and prevents the further rearward movement of the bar, the latter thus being conveniently supported in inoperative position beneath the frame of the truck.

Upon drawing the bar forward through the apertures, in the supporting parts, the cross plate 21 passes through the plate 28 and is brought into abutment with the plate 27 as shown by the broken lines in Fig. 1, whereupon the rear portion of the bar drops down in the aperture 32 to engage the notch 22 with the supporting plate and secures the bar in operative position.

To couple up the hand trucks for movement in trains, the hook 23 on the forward end of the coupling bar is engaged over the end rest 14 carried by a similar leading truck. A recess 36 is cut in the upper edge of the end rest to receive the shank of the hook. The length and shape of the bar is such that when it is in operative position and two trucks coupled in the manner illustrated, the handle end of each trailing truck will be lifted sufficiently to raise the supporting legs 19 clear of the floor.

In operation the coupling bar is rigidly secured as to lateral movement in its relation to the trailing truck, while its connection with the leading truck is a flexible one permitting the relative swinging of the two coupled trucks. In their movement in trains, the draft pull is taken upon the hook 23 and the cross plate 21 abutting the support 27. The distance between the trucks is preserved by the engagement of the shoulder 25 with the end rest 14 of the leading truck. By coupling the series of trucks to a unit of locomotive power, the entire train may be moved without other attendance to the trucks than that required in coupling the train.

It will now be apparent that I have provided simple, durable coupling means conveniently attached to standard hand trucks for connecting them in trains for transportation, and that by the use of my invention a great amount of labor heretofore required in the separate handling of the trucks, may be saved.

I claim as my invention:—

1. In combination with a hand truck, a coupling bar, and means for mounting said bar comprising a plurality of hangers fixed to the truck and arranged to receive said bar in slidable engagement whereby said bar may be carried in inoperative position disposed beneath said truck, or extended to operatively engage another truck.

2. In a hand truck, the combination of a coupling bar, and means for securing said bar to the truck, said means being adapted to carry said bar in inoperative position remote from the truck handles to avoid interference with the manual operation of said truck, and permitting the extension of said bar to operative position out beyond the truck handles for connection with a draft unit.

3. A draft coupling for two wheel hand trucks comprising a bar secured to one truck and longitudinally movable relative to the truck handles to be extended out between the same for flexible connection with another truck or removed to an out-of-the-way position relative to the handles, said bar being arranged to support said first mentioned truck in part upon said second mentioned truck when in extended position.

4. In combination, a hand truck having a wheel support at one end only and having handles at its opposite end, and a draft coupling permanently mounted on the truck and having a coupling device at one end, the coupling device being selectively movable to project beyond said handles for engagement with another truck, or into inoperative position removed from said handles.

5. In a hand truck having a single wheel-carrying axle and a frame mainly supported thereon, the combination of a draft coupling bar, and a plurality of hangers therefor secured to said frame, said bar being disposed substantially beneath said frame when in inoperative position and being slidable through said hangers into operative position for attachment to a drawing unit, said bar being adapted when so attached to partially support said frame and guide said truck in its movement.

6. In combination with a hand truck having a frame, draft means comprising a plurality of hangers mounted transversely on the frame, said hangers having bearings therein in longitudinal alinement, a coupling bar slidably supported in said bearings, a cross member mounted on said bar adapted to abut one of said hangers to limit rearward movement of said bar and to abut another of said hangers to limit the forward position of the bar, and means mounted on the outer end of said bar to engage a drawing unit for moving said truck.

7. In a hand truck having a frame supported at one end on a pair of wheels and having handles extending from the other end of the frame, the combination of a coupling bar, a series of hanger plates attached to said frame and having longitudinally alined apertures adapted to receive said coupling bar in sliding engagement, a member on the bar arranged to selectively engage certain of said hanger plates to limit the sliding movement of said bar, said bar being selectively movable into inoperative position beneath said frame rearwardly of said handles and being movable outwardly between said handles to engage a drawing unit.

8. A hand-truck having, in combination, a bed, two hangers disposed one behind the other near the middle of and beneath the bed, and a coupling bar slidably mounted in the hangers, said bar having a cross-piece adapted to engage the rear hanger to limit rearward movement of the bar and to engage the other hanger to limit forward movement of the bar.

9. A truck-coupling consisting of a bar of angular cross-section, a cross-piece secured to the upper web of the bar near the rear end thereof, the bar having a notch in its vertical web forward of the cross-piece, and a hook at the forward end of the bar.

10. A truck-coupling bar having a hook at one end, a cross-piece at its other end, and a notch in its lower portion forward of the cross-piece.

11. In combination, a hand truck, a coupling connector permanently associated with the truck, and means on the truck arranged to be engaged by the connector when the latter is extended between the truck and another truck to couple the trucks together, and means on the truck arranged to be engaged by the connector for carrying the same about inoperatively with the truck when the truck is used uncoupled.

In testimony whereof, I have hereunto set my hand.

ESTIL J. HUFFMAN.